United States Patent
Huang et al.

(10) Patent No.: US 8,582,695 B2
(45) Date of Patent: Nov. 12, 2013

(54) METHOD FOR SELECTING TRANSMITTING POINTS IN A COMMUNICATION SYSTEM

(75) Inventors: Chung-Jung Huang, Hsinchu (TW);
Chih-Sheng Sung, Hsinchu (TW);
Ta-Sung Lee, Hsinchu (TW)

(73) Assignee: National Chiao Tung University, Hsinchu (TW)

( * ) Notice: Subject to any disclaimer, the term of this patent is extended or adjusted under 35 U.S.C. 154(b) by 911 days.

(21) Appl. No.: 12/692,446

(22) Filed: Jan. 22, 2010

(65) Prior Publication Data
US 2011/0007853 A1    Jan. 13, 2011

(30) Foreign Application Priority Data
Jul. 13, 2009    (TW) ............................... 98123659 A

(51) Int. Cl.
*H03D 1/00*    (2006.01)

(52) U.S. Cl.
USPC ........... 375/341; 375/340; 375/316; 375/267; 375/259; 375/260

(58) Field of Classification Search
USPC .................. 375/341, 340, 316, 267, 259, 260
See application file for complete search history.

(56) References Cited

U.S. PATENT DOCUMENTS

2008/0298478 A1*   12/2008   Kim et al. .............. 375/260

OTHER PUBLICATIONS

Mondal et al.: A Novel Approach for K-Best MIMO Detection and Its VLSI Implementation; Circuits and Systems 2008, 2008 IEEE, pp. 936-939.

* cited by examiner

*Primary Examiner* — Zewdu Kassa

(57) ABSTRACT

The present invention provides a method for identifying a specific number of communicating points having relatively smallest accumulated path values from a plurality of transmitting points for a receiving point in a communication system. The method includes steps of: (a) defining a first coordination of each of the plurality of transmitting points and the receiving point on a complex plane; (b) transferring the first coordination of the receiving point to a second coordination thereof, in which the second coordination of the receiving point is near an origin of the complex plane; and (c) identifying the specific number of transmitting points having relatively smallest accumulated path values based on the second coordination of the receiving point.

8 Claims, 12 Drawing Sheets

METHOD FOR SELECTING TRANSMITTING POINTS IN A COMMUNICATION SYSTEM

FIELD OF THE INVENTION

The present invention relates to a receiver in a wireless communication system, and more particularly to a method for selecting transmitting points from a plurality of candidates for a receiver in a wireless communication system.

BACKGROUND OF THE INVENTION

In the field of wireless communication, the multi-input and multi-output (MIMO) system provides effective and promising solutions for achieving high data-rate with reliable transmission.

For example, in an MIMO communication system having M receiving antenna for receiving N transmitting signals from N transmitting antennas, for each transmitted vector, the received signals can be shown as below:

$$y = \begin{bmatrix} y_1 \\ y_2 \\ \vdots \\ y_M \end{bmatrix}$$

$$= \begin{bmatrix} h_{1,1} & h_{1,2} & \cdots & h_{1,N} \\ h_{2,1} & h_{2,2} & \cdots & h_{2,N} \\ \vdots & \vdots & \ddots & \vdots \\ h_{M,1} & h_{M,2} & \cdots & h_{M,N} \end{bmatrix} \begin{bmatrix} x_1 \\ x_2 \\ \vdots \\ x_N \end{bmatrix} +$$

$$\begin{bmatrix} n_1 \\ n_2 \\ \vdots \\ n_M \end{bmatrix} \quad \boxed{M \geq N}$$

$$h_{i,j} \sim i.i.d.CN(0,1)$$
$$n_i \sim i.i.d.CN(0, \sigma^2)$$

$$= Hx + n$$

Equation (1)

Where y is the received vector having M elements, x is the vector representing the transmitted signals, H is the channel matrix of the MIMO communication system, and n is the noise vector. If there is no interfering source that continuously affects the communication system, in other words, the noises existing in the communication system randomly occur. Therefore, the relationship between y and x are dependent upon the channel matrix H and a disturbed term.

Please refer to FIG. 1, which schematics an algorism for sphere decoders known to the art at a 2N-dimensional space. According to FIG. 1, a white spot indicated as receiving point shows the location of a received signal (an element of the vector y) in the 2N-dimensional space having plural mesh points, each of which indicates the coordination of the transmitting points (signals). An arrow in FIG. 1 shows a radius of a 2N-dimensional hypersphere. The length of the arrow indicates a predetermined value. A number of calculations are performed by calculating for the distance between each of the mesh point inside the 2N-dimensional hypersphere and the receiving point to identify the mesh point having the smallest distance to the receiving point.

An IEEE paper, "A Novel Approach for K-best MIMO Detection and its VLSI Implementation", provides a method of searching for candidate nodes. The searching method set forth above can be split into N layers of searching for candidates on complex planes. Please refer to FIG. 2, which schematics the method of searching for candidates known to the art. The method is doing search from a center of searching and starting from a search inside the area of a circle centered at the center of searching and having a radius of an initial value. If an effective transmitting (signal) point is found, the initial value of the radius is considered as the path value of the founded effective transmitting (signal) point. Then the radius is increased step by step until the circle encompasses all the effective transmitting (signal) points on the complex plane. During the process, the value of the radius when the circle touches an effective transmitting (signal) point is considered as the path value of the effective transmitting (signal) point. However, this method has some large defects: (1) For a particular circle, the amount of sampling points shall be sufficiently large so as to effectively contact all the nodes on the circle. For a particular value of the radius, each of the sampled points on the circle needs to be checked for the path value thereof. Therefore, the total amount of calculation is huge. (2) The calculated path values are not the exact values, particularly when the radius is gradually enlarged. (3) If there are a large number of effective transmitting (signal) points to be sampled, either repeated sampling or missing sampling might occur. So, the author of the paper adds a sub-module of redundancy remover to avoid such a dilemma.

Two searching algorithms, namely Schnorr-Eucher (SE) enumeration and the K-best method, are widely adopted particularly in the use of sphere decoders. However, the current methods for searching for the optimum transmitting points on a complex plane cannot be both economical and reliable. The SE enumeration can achieve the same performance as the maximum-likelihood (ML) detector, which searches all possible combinations of transmitted symbols, with reduced complexity. To overcome the abovementioned issues, the K-best method was introduced. The K-best method is proposed to avoid the mentioned issues by choosing an integer number k as the number of survival candidate nodes to be calculated for next layer of a searching tree, when the process of searching for the optimum transmitting points is simulated with the searching tree model. However, the K-best method is a trade-off between the performance and the computation loading, when determining the value of k.

Whenever the number k is determined, only the k candidate nodes in each layer of the searching tree will be reserved for later calculation while the other candidate nodes will be given up. If the number k is small, the K-best method would save a large amount of calculations. But the problem is: there is a good chance to give up the optimum candidates at the early stage of the calculation.

SUMMARY OF THE INVENTION

To overcome the abovementioned drawback, the present invention provides a method for identifying a specific number of communicating points having relatively smallest accumulated path values from a plurality of transmitting points for a receiving point in a communication system. The method includes steps of: (a) defining a first coordination of each of the plurality of transmitting points and the receiving point on a complex plane; (b) transferring the first coordination of the receiving point to a second coordination thereof, in which the second coordination of the receiving point is near an origin of the complex plane; and (c) identifying the specific number of transmitting points having relatively smallest accumulated path values based on the second coordination of the receiving point.

Preferably, the step (c) further comprising the following sub-steps: (c1) providing a plurality of sequences, each of which includes plural candidates having accumulated path values respectively, and being arranged in an increasing order according to the accumulated path values thereof; (c2) selecting one from the plurality of sequences based on the second coordination of the receiving point; (c3) choosing the specific number of candidates having the relatively smallest accumulated path values from the selected sequence; (c4) identifying a second coordination of each of the specific number of candidates having the relatively smallest accumulated path values on the complex plane; and (c5) inversely transferring the second coordination of the each of the specific number of candidates having the smallest accumulated path values to the first coordination thereof. The plurality of sequences in step (a) are obtained by either calculating for the accumulated path values of the candidates or looking up a table.

In accordance with another aspect of the present invention, a method for producing a specific number of communicating candidates having relatively smallest accumulated path values is provided. The method comprises steps of: (a) providing a plurality of sequences, each of which includes candidates having an accumulated path value respectively, and each of which follows an increasing order according to the accumulated path values of the candidates; and (b) processing the plurality of sequences for identifying the specific number of communicating candidates having relatively smallest accumulated path values.

Preferably, the step (b) further comprises the following sub-steps: (b1) inputting at least a candidate according to the increasing order in each of the plurality of sequences into a parallel processor, respectively; (b2) utilizing the parallel processor to identify at least a candidate having the respective relatively smallest accumulated path value from the inputted candidates; (b3) inputting a candidate subsequent to the candidate identified in the step (b2) into the parallel processor; and (b4) repeating the steps (b1) to (b3) until the specific number of candidates having the relatively smallest accumulated path values are identified.

Preferably, the parallel processor includes a plurality of input entries. When a total number of the plurality of sequences exceeds a total number of the input entries of the parallel processor, the method further comprises steps of: (a1) arranging the plurality of sequences into a plurality of groups, wherein a total number of sequences in each of the groups is one of equal to and less than the total number of the input entries of the parallel processor; (a2) repeating the steps (b) to (d) for each of the groups until the specific number of the candidates in the each groups having the relatively smallest accumulated path values are identified; and (a3) turning the plurality of groups into the plurality of sequences, each of which includes the specific number of candidates having the relatively smallest accumulated path values in the each group.

Preferably, the parallel processor includes j input entries, the j is an even integer, and when the plurality of sequences are two sequences, the step (b) comprises steps of: (bb1) inputting first k candidates according to the increasing order in a first one of the two sequences into the odd-numbered input entries of the parallel processor, wherein k=j/2; and (bb2) inputting first k candidates according to the increasing order in a second one of the two sequences into the even-numbered input entries of the parallel processor.

In accordance with a further aspect of the present invention, an optimized K-best method in a multi-input multi-output (MIMO) communication system is provided. The method includes steps of performing a QR decomposition for a channel matrix of the MIMO communication system to obtain an R matrix having a plurality of diagonal elements and determining whether a K-best algorithm is performed based on values of the diagonal elements. Preferably, the method further comprising steps of determining an integer i based on a dimension of the channel matrix and sequentially comparing the respective value of each of the i diagonal elements with a threshold, to determine whether the K-best algorithm with a predetermined number of candidates is performed. For each of the i diagonal elements, there exists a predetermined threshold.

Preferably, the i diagonal elements are the i diagonal elements counted from a bottom of the R matrix.

Preferably, the K-best algorithm is not performed for i layers of the candidates, if all the compared values of the i diagonal elements do not exceed the corresponding thresholds.

Preferably, the integer i is obtained according to an cumulative possibility function of the values of the diagonal elements.

Preferably, the method further comprises steps of allocating all candidates available for the MIMO communication system into j sequences, when the K-best algorithm is not performed, wherein j is an integer, re-arranging the candidates of each of the j sequences in an increasing order according to a relative path value of each of the candidates, and performing a parallel calculation to identify a plurality of candidates having smallest relative path values from the re-arranged sequences.

Preferably, the relative path value is a distance on a complex plane.

Preferably, the step of re-arranging the candidates is implemented by looking up a table, and the j is a smallest integer no less than a square root of a total number of all the candidates available for the MIMO communication system.

The above objects and advantages of the present invention will be more readily apparent to those ordinarily skilled in the art after reading the details set forth in the descriptions and drawings that follow, in which:

BRIEF DESCRIPTION OF THE DRAWINGS

FIG. 4b shows a magnified diagram of the first quadrant of the dotted square area in FIG. 4a;

DETAILED DESCRIPTION OF THE PREFERRED EMBODIMENT

The present invention will now be described more specifically with reference to the following embodiments. It is to be noted that the following descriptions of preferred embodiments of this invention are presented herein for the purposes of illustration and description only; it is not intended to be exhaustive or to be limited to the precise form disclosed.

Figure 1:
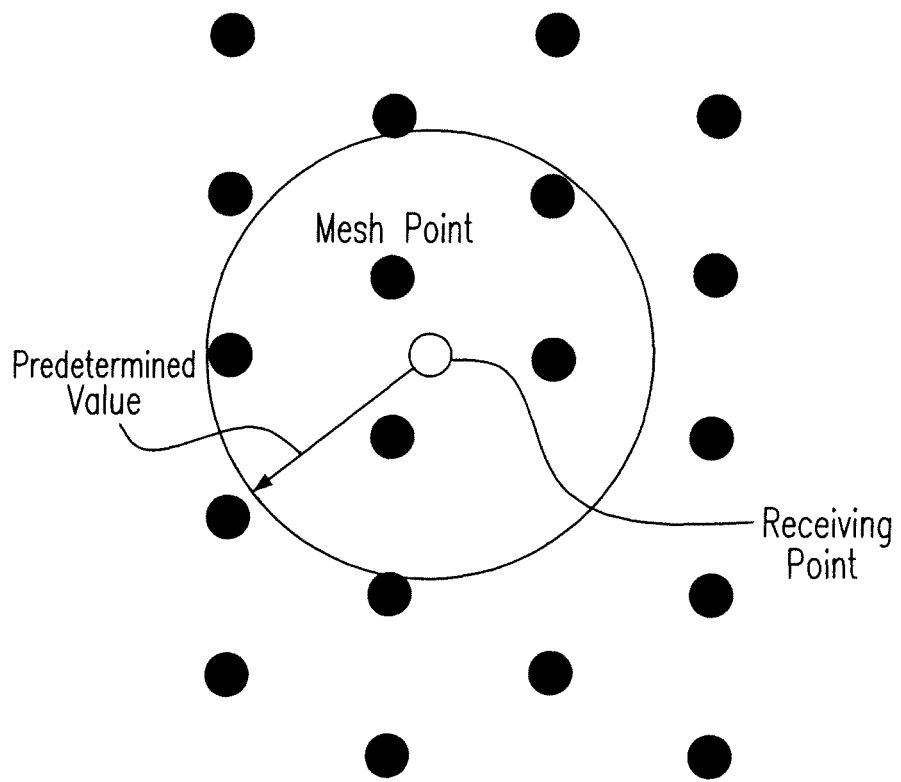
FIG. 1 is a schematic diagram of an algorism for sphere decoders known to the art at a 2N-dimensional space.
Figure 2:
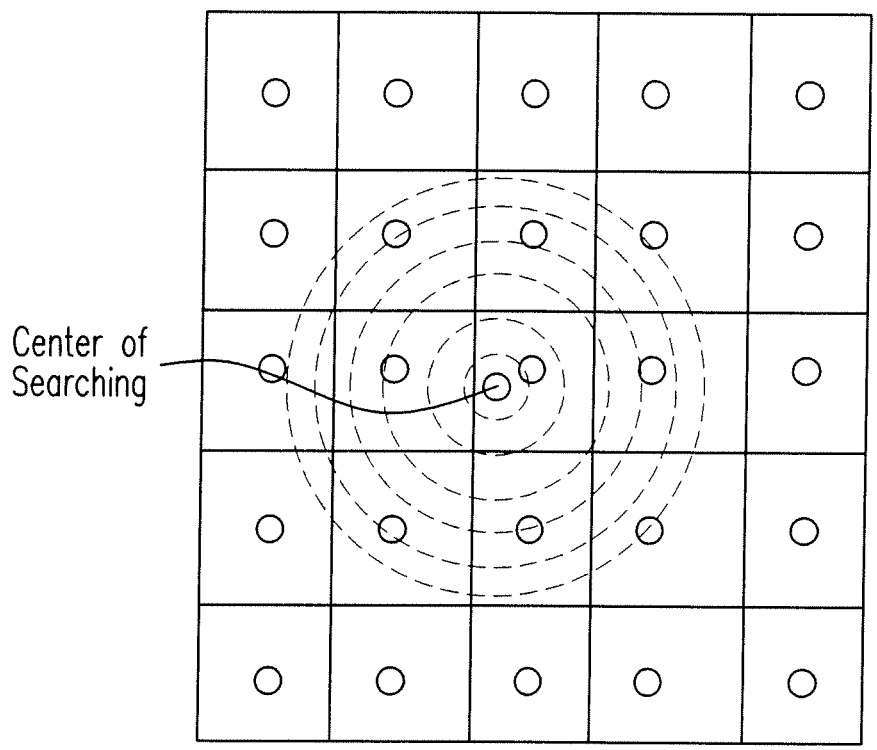
FIG. 2 is a schematic diagram illustrating a method of searching for candidates known to the art.
Figure 3:
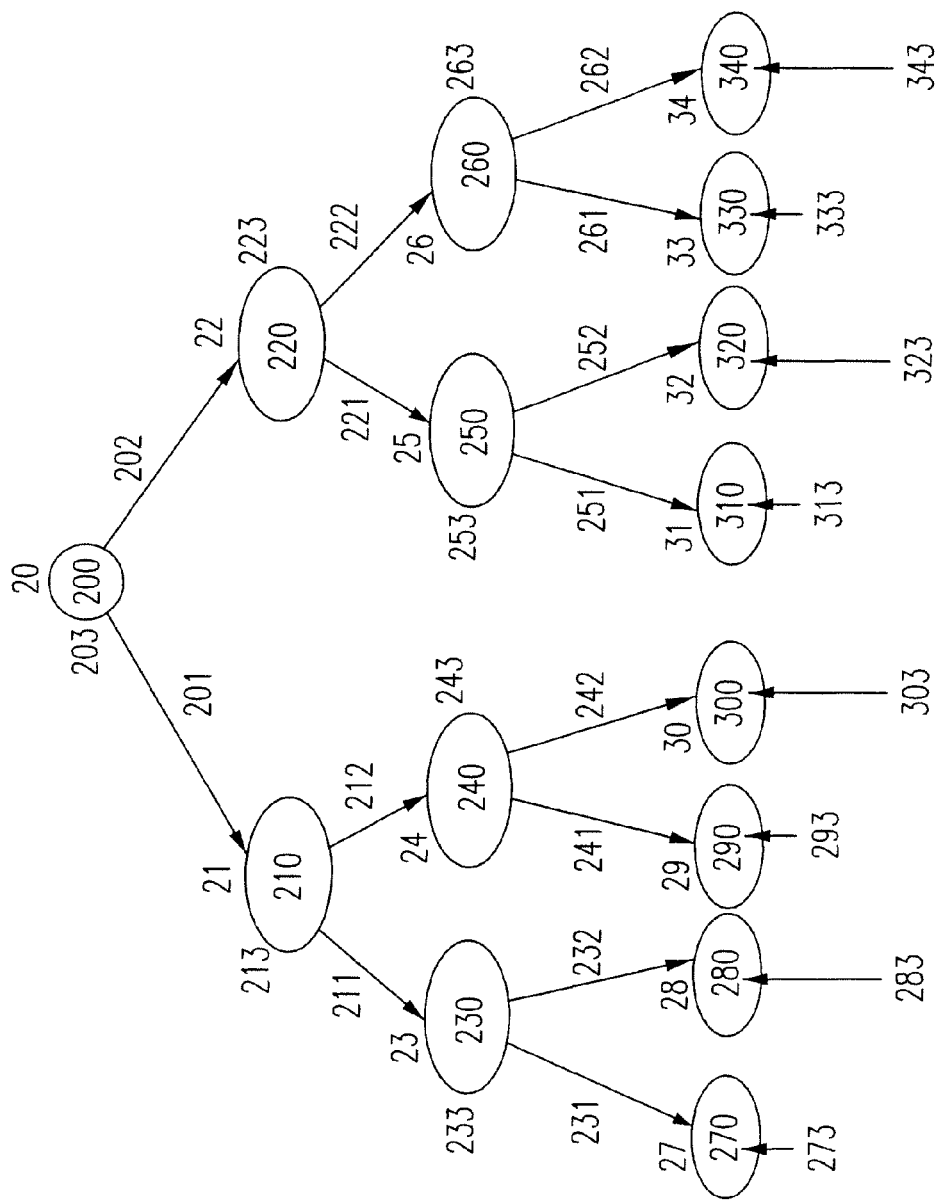
FIG. 3 is illustrates a searching tree of 3 layers.

Please refer to FIG. 3, a schematic diagram showing a searching tree having three layers, in which two branches exist in each node for example. The structure of the searching tree shown in FIG. 3 simulates an MIMO communication system having three receiving antennas and three transmitting antennas, each of which is drawn from a signal set containing two signal points. Each node contains an accumulated path value, and has two options for selecting the received signals respectively.

Starting from node 20, which contains an accumulated path value 200 being zero in theory, there are two branches showing the path distances 201 and 202 between the parent node 20 and the child nodes 21 and 22 respectively. The node 21 contains an accumulated path value 210. Again, there are two branches showing the path distances 211 and 222 between the parent node 21 and the child nodes 23 and 24 respectively. Node 23 contains an accumulated path value 230 of the path from node 20 to node 23 via node 21. Likewise, Node 27 contains an accumulated path value 270 of the path from node 20 all the way to node 27 via nodes 21 and 23. It can be observed that there are eight nodes indicating all the eight possible combinations of antennas versus signals in the MIMO communication system. Therefore, one may identify a node having the smallest accumulated path value from one of the eight nodes at the bottom of the searching tree.

The Quadrature Amplitude Modulation (QAM) is often employed for carrying data in wireless communication systems. QAM conveys data by changing some aspect of a carrier signal, or the carrier wave, in response to a data signal. Similar to other methods of modulation, the group of transmitted signals can be illustrated by a constellation diagram on a complex plane. Please refer to FIG. 4a, which schematics a constellation diagram of a 64-QAM system. Totally 64 transmitting points 0~63 are placed at the locations whose coordination are odd integers near the origin of the complex plane. According to FIG. 4a, a received data signal is located at a location x surrounded by points 41, 42, 49 and 50 in the constellation diagram. The four transmitting points are the ones having relatively smallest distances to the location x. In addition, a sequence, 49-50-41-42, can be identified in accordance with the distance from the location x to the transmitting points. Now consider the dotted square area near the origin and surrounded by the transmitting points 27, 28, 35 and 36. Transferring the coordination of points 41, 42, 49 and 50 to the points 27, 28, 35 and 36 respectively, a location y corresponding to the location x can be identified. A new sequence, 35-36-27-28, can be identified in accordance with the distance from the location y to the transmitting points. It is observed that the relations in terms of distance from the location x to all the nearby transmitting points is remain unchanged after the mentioned spatial transfer. It also can be easily observed that the coordination of the transmitting points on the complex plane is symmetric both vertically and horizontally. Once the special relations between a point in one of the four quadrants in the complex plane, say the first quadrant, and those transmitting points have been identified, those of 3 points at the mirrored locations in the other 3 quadrants can be derived by taking advantage of the character of symmetry of the constellation diagram.

Figure 4A:
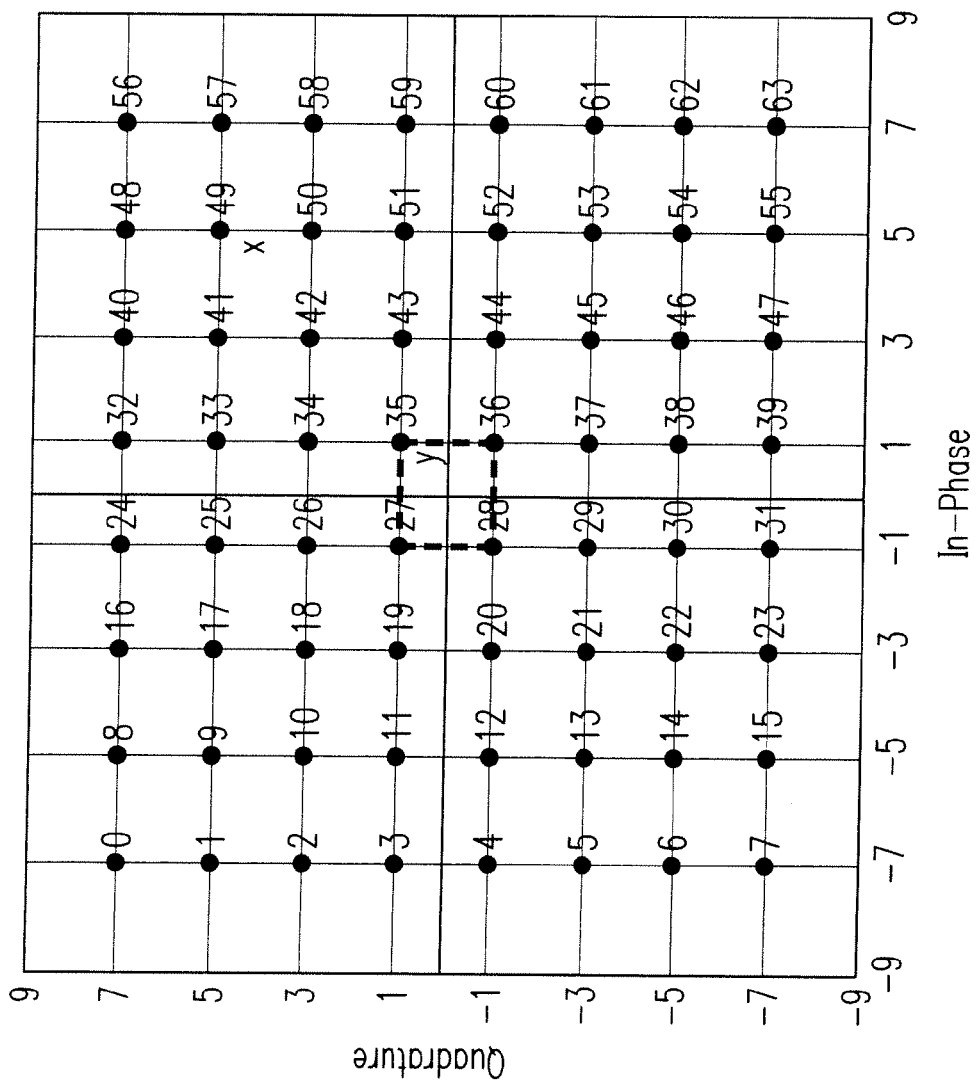
FIG. 4a is a constellation diagram of 64-QAM.
Figure 4B:
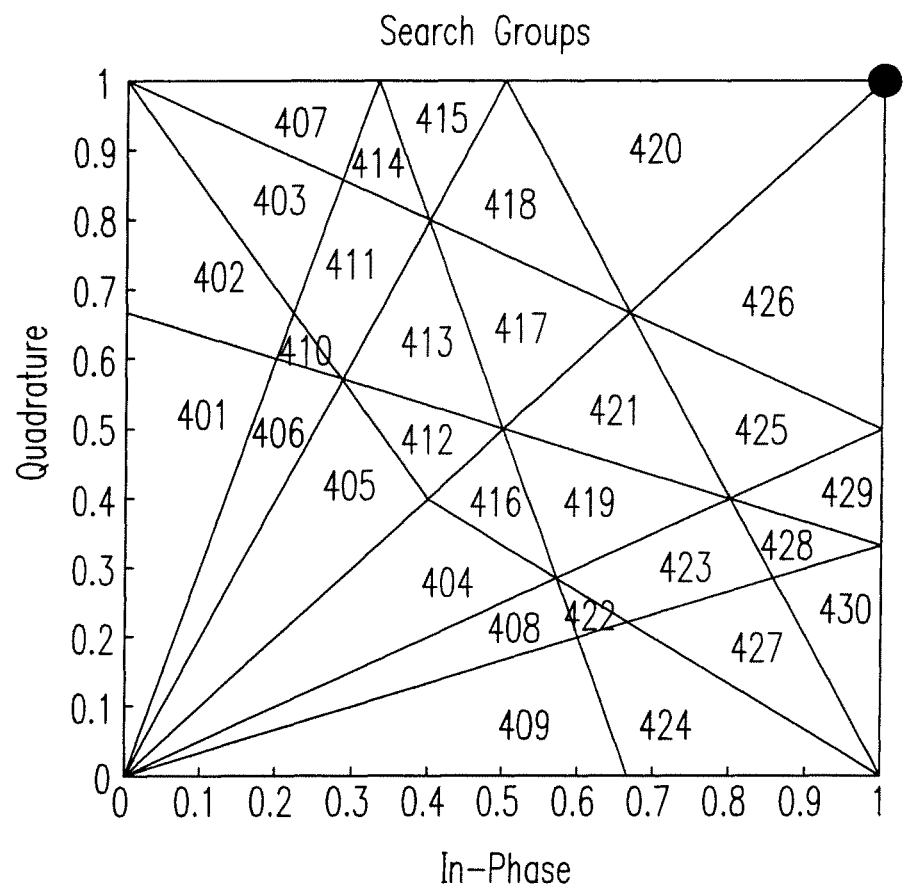

Please refer to FIG. 4b, which shows a magnified diagram of the first quadrant of the dotted square area in FIG. 4a. The area shown in FIG. 4b is divided into 30 sections 401~430. It is verified that, any location in each of the sections 401~430, the order in terms of distance from the location to the transmitting points 0~63 is identical. For each of the sections 401~430, a unique sequence that lists a number of transmitting points in accordance with an increasing order based on the distance thereof can be specified. Table 1 shows all the 30 sequences having 11 elements according to one embodiment of the present invention. With similar idea, one may construct different types of tables by dividing the area in different ways, or choosing different number of elements in the sequences.

TABLE 1

List of candidate sequences

| Section ID | Candidate Sequence |
|---|---|
| 401 | 35→27→36→28→34→26→43→19→44→20→37 |
| 402 | 35→27→36→28→34→26→43→19→44→20→42 |
| 403 | 35→27→36→28→34→26→43→19→44→42→20 |
| 404 | 35→36→27→28→43→34→44→26→37→19→29 |
| 405 | 35→27→36→28→34→43→26→44→19→37→20 |
| 406 | 35→27→36→28→34→26→43→44→19→20→37 |
| 407 | 35→27→36→34→28→26→43→19→44→42→20 |
| 408 | 35→36→27→28→43→44→34→26→37→29→19 |
| 409 | 35→36→27→28→43→44→34→37→26→29→19 |
| 410 | 35→27→36→28→34→26→43→44→19→20→42 |
| 411 | 35→27→36→28→34→26→43→44→19→42→20 |
| 412 | 35→27→36→28→34→43→26→44→19→37→42 |
| 413 | 35→27→36→28→34→43→26→44→19→42→37 |
| 414 | 35→27→36→34→28→26→43→44→19→42→20 |
| 415 | 35→27→36→34→28→26→43→44→42→19→20 |
| 416 | 35→36→27→28→43→34→44→26→37→19→42 |
| 417 | 35→27→36→28→34→43→26→44→42→19→37 |
| 418 | 35→27→36→34→28→43→26→44→42→19→37 |
| 419 | 35→36→27→28→43→34→44→26→37→42→19 |
| 420 | 35→27→36→34→43→28→26→44→42→19→37 |
| 421 | 35→36→27→28→43→34→44→26→42→37→19 |
| 422 | 35→36→27→28→43→44→34→26→37→29→42 |
| 423 | 35→36→27→28→43→44→34→26→37→42→29 |
| 424 | 35→36→27→28→43→44→34→37→26→29→42 |
| 425 | 35→36→27→43→28→34→44→26→42→37→19 |
| 426 | 35→36→27→43→34→28→44→26→42→37→19 |
| 427 | 35→36→27→28→43→44→34→37→26→42→29 |
| 428 | 35→36→27→43→28→44→34→26→37→42→29 |
| 429 | 35→36→27→43→28→44→34→26→42→37→29 |
| 430 | 35→36→27→43→28→44→34→37→26→42→29 |

Again, refer to FIGS. 4a and 4b. If one would like to identify 8 transmitting point having the relatively smallest distances from the location x on the constellation diagram, he/she may identify the section where the y is located based on the coordination of y. For example, the y is located at the section 423. According to Table 1, the first 8 elements in the candidate sequence corresponding to the section 423 are: 35, 36, 27, 28, 43, 44, 34 and 26, which identify the transmitting points having the relatively smallest distances to the location y. Since the spatial structure of the constellation diagram at different areas are similar to each other, the order in terms of distance from the location y to the identified transmitting points would be the same with that of the location x to those transmitting points after a spatial transfer to the identified transmitting points. For this example, the transmitting points corresponding to 35, 36, 27, 28, 43, 44, 34 and 26 are 49, 50, 41, 42, 57, 58, 48 and 40, respectively. Therefore, one may obtain the 8 transmitting points having the smallest distances to the location x by looking up a table without calculation. If the table is not available, the method of coordination or spatial transfer is still useful for the same purpose. Notably the distances on the constellation diagram should be considered as path values between the receiving signals and the transmitted signals in real practices.

There exist a variety of ways to identify the order in terms of the distances between a particular location, says the x, to plural points, such as the transmitting points, located on the nodes of a complex plane. A useful method is to calculate for the value of each of the distances and then compare the values to identify the order. Those candidate sequences listed in Table 1 can be obtained by means of calculating and comparing. Refer to FIG. 4a, if all the candidate nodes are located on a line vertical to the X axis, says points 40~44 for instance, one may identify either an increasing or decreasing order among the distances from the location x to the points 40~44 simply by comparing the imaginary part of the path values thereof, since the real part of the paths from the location x to the points 40~44 are identical. Now consider all the candidate nodes are located on a line vertical to the Y axis, says points 26, 34, 42, 50 and 58 for instance. Likewise, since the imaginary part of the paths from the location x to the points 26, 34, 42, 50 and 58 are the same, either an increasing or decreasing order among the distances from the location x to the points can be obtained by simply comparing the real part of the path values thereof.

Figure 5A:
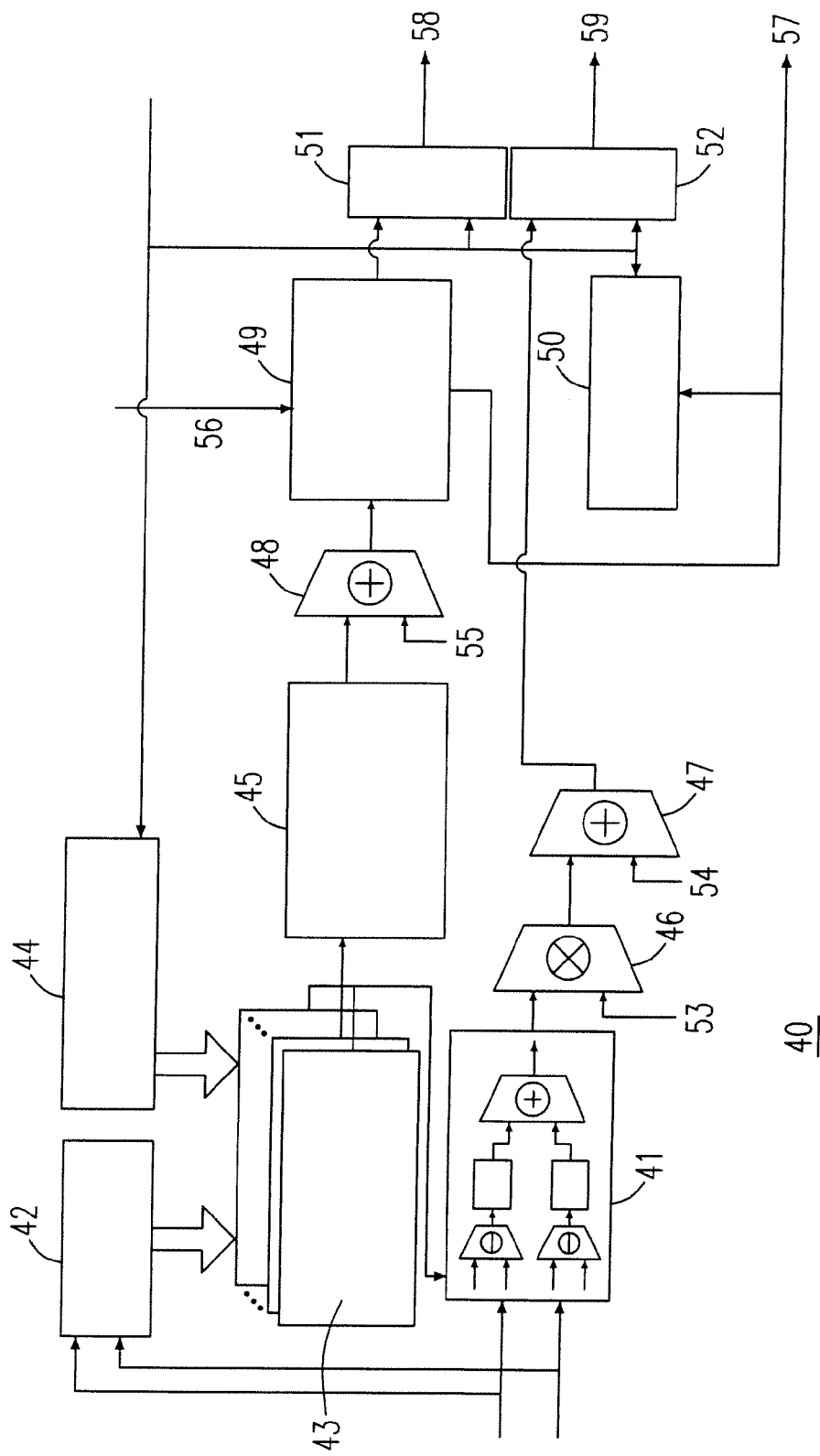
FIG. 5a illustrates the circuit layout of the CCPG provided by the present invention.

FIG. 5a illustrates the circuit layout of a complex plane path calculator module and candidate point generator (CCPG) 40 having a path calculator 41, a group of memories 42, a child node memory 43, a first up-counter 44, a quadrant restore device 45, a weighting adjustment device 46, a parent weight 47, a coordination transferor 48, a boundary checker 49, and a second up-counter 50, according to one embodiment of the present invention. The CCPG 40 is capable for providing sequences, each of which includes candidates having an accumulated path value respectively, and each of which follows an increasing order according to the accumulated path values of the candidates.

Figure 5B:
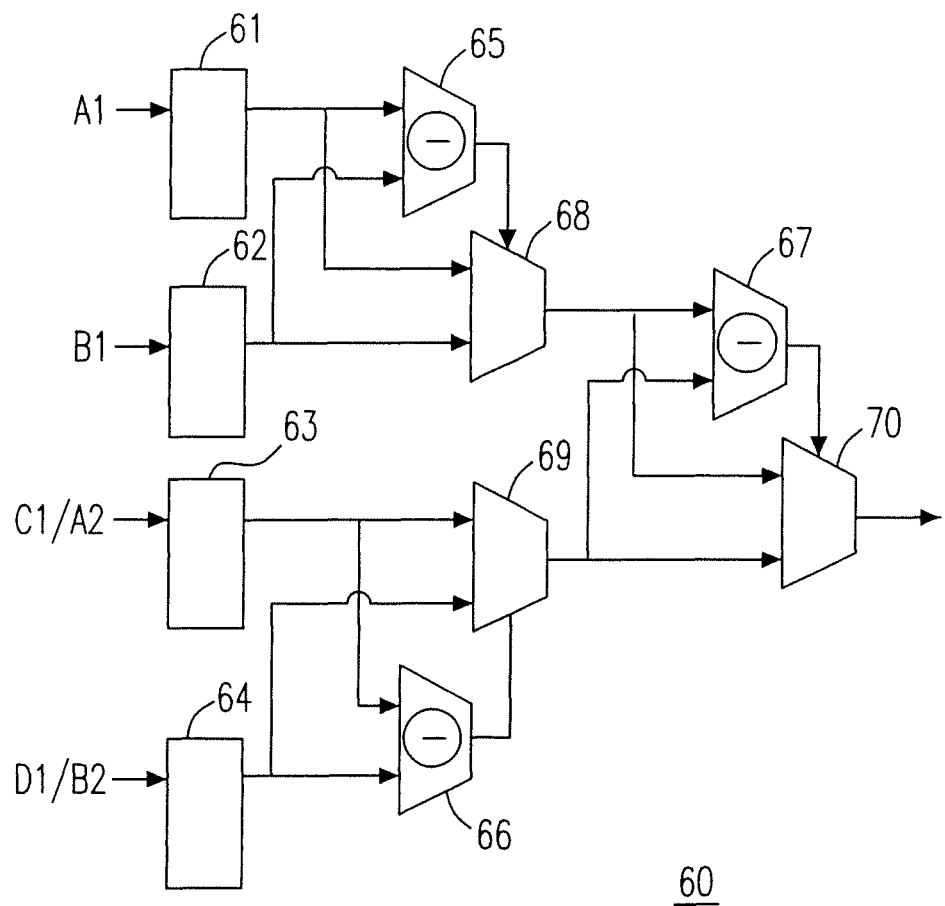
FIG. 5b shows a parallel processor having 4 input entries.

When the relative distance or path values of each of a plurality of candidates, such as transmitting points to be selected on the constellation diagram, to a destination, say a receiving point, are determined, the method of parallel comparison is a useful tool for identifying the candidate having the smallest path values to the destination. Please refer to FIG. 5b, which shows a parallel processor 60 having four input entries. According to FIG. 5b, the parallel processor 60 comprises registers 61~64 disposed at the four input entries, a first, a second and a third subtracters 65~67, and a first, a second and a third multiplexer 68~70. Each of the subtracters 65~67 subtracts the values of the two candidates inputted therein to obtain a value for judgment. The corresponding multiplexer receives the value for judgment and selectively transmits the candidate having smaller value.

Now consider four candidates, namely A, B, C and D, are placed in the registers 61~64 for a comparison, it takes 3 steps for the parallel processor to complete the comparing and identify the candidate having the smallest value. Firstly, A is compared with B while C is compared with D. If A and C are the smaller ones, they will be transmitted by the first and the second multiplexer 68 and 69 respectively. Then A is compared with C to identify the one who has the smallest value out of the four candidates. To identify the candidate having the second smallest value, assuming A has been identified as the one having the smallest value, B is transmitted by the multiplexer 68 and be compared with C which has already been transmitted by the multiplexer 69. Therefore it takes only one more step for the parallel processor 60 to identify the one having the second smallest value out of the four candidates. Then, the candidates having the third and the fourth smallest values respectively can be identified by similar process. It is observed that the one having the smallest value in N candidates can be identified by parallel calculation with N−1 step, and a sequence of N elements in an increasing order can be identified by means of parallel calculation in (N−1)+(log$_2$N)*(N−1) steps. Compared with the traditional bubble sort algorithm which needs N*(N−1)/2 steps of calculations to identify a sequence of N elements in an increasing order, the method of parallel calculation saves a lot of calculations particularly when N is a large integer. The main advantage of the method of parallel comparison is that it avoids some unnecessary steps of comparison based on known results.

The present invention takes advantages of the method of parallel calculation in a variety of novel applications. According to a preferred embodiment, the present invention provides a method for identifying a specific number of candidates having the relatively smallest values, such as accumulate path values or distances, from a plurality of candidates. The plurality of candidates is firstly divided into a number of groups, where the number is the same with the number of input entries of a parallel processor to be used. In this example, since the parallel processor 60 illustrated in FIG. 5b has four input entries, the plurality of candidates are arranged into four groups, say A, B, C and D. The purpose for this embodiment is to select the specific number, say 4 for example, from a big number of candidates, for example, 64 candidates. The 64 candidates are evenly divided into the 4 groups, so each of the groups A, B, C and D comprises 16 candidates.

Taking group A for instance, it contains candidates A1~A16. Again, group A can be evenly divided into four subgroups, namely Aa, Ab, Ac and Ad, each of which comprises four candidates. For example, Aa comprises A1~A4, Ab does A5~A8, Ac does A9~A12, and Ad does A13~A16. For each subgroup, a sequence in increasing order based on the values of the candidates can be identified by using the parallel processor 60. Then, one may arrange the four sequences following increasing order according to the value of the candidates thereof at each of the input entries of the parallel processor 60 so that the candidate having the smallest value of each sequence is entered the parallel processor 60. For example, the one from the subgroup Aa, Ab, Ac and Ad are at the first, the second, the third, and the fourth input entries 61~64 respectively. After a parallel comparison implemented by the parallel processor 60, the candidate having the smallest value is identified, for example the candidate A1 which is from the subgroup Aa. Then, the candidate having the second smallest value in the subgroup Aa is entered the first input entry 61 of the parallel processor 60. The newly entered candidate is compared with the one already at the second input entry 62 in terms of the value. The smaller one is then compared with the candidate that already registered at the multiplexer 69. After comparison, the candidate having the second smallest value is identified and transmitted from the multiplexer 70. Likewise, the candidates having the third and fourth smallest values of group A therein can be identified by the same process. Now, a sequence of four candidates having the smallest, the second smallest, the third smallest and the fourth smallest values of group A therein and listed in increase order is therefore identified.

Likewise, the sequences of four candidates having the smallest, the second smallest, the third smallest and the fourth smallest values in groups B, C and D can be identified by the similar process. Repeating the same process by placing each of the sequences having the smallest, the second smallest, the third smallest and the fourth smallest values in groups A~D toward the input entries 61~64 of the parallel processor 60 respectively, and replacing the identified candidate whenever it is identified with the next candidate from the same sequence that the identified candidate is from, eventually the four candidates having the smallest values can be identified.

An alternative way for the abovementioned embodiment is to obtain a sequence having all the candidates following an increasing order according to their values for each of the groups A, B, C, and D. So, the corresponding sequences for groups A~D each comprises 16 candidates. For this particular example, a larger number of candidates having the smallest values, such as 7 but no larger than 16, can be identified by implementing the same procedure set for above.

According to another preferred embodiment, the present invention provides a method for identifying a specific number of candidates having the relatively smallest values, such as accumulated path values or distances, from two groups of candidates. Firstly, a sequence following an increasing order according to the values of the candidates for each of the two groups is obtained either by calculating, such as using the CCPG 40 illustrated in FIG. 5a, or by looking up tables if applicable. For instance, the two sequences, namely sequence A and sequence B, include candidates A1~A16 and B1~B16 respectively. Notably, the candidates A1~A16 and B1~B16 respectively in sequences A and B are listed in an increasing order according to the values of the candidates.

A parallel processor usually has totally even number of input entries, say L for example. If each of the input entries is identified with an integer and all the integers used for identifying the input entries are in an integral sequence, there are L/2 input entries having even identification numbers while L/2 having odd identification numbers. The first L/2 candidates in one of the sequences, sequence A for instance, are arranged to the odd-numbered input entries and the first L/2 candidates in the other sequence, sequence B for this example, to the even-numbered input entries. Since there are four input entries 61~64 in the parallel processor 60, there are two input entries 61 and 63 of odd input entry numbers while the other two input entries 62 and 64 of even input entry numbers. The first two candidates in the sequence A, A1 and A2, is placed at the odd-numbered input entries 61 and 63, while the first two candidates in the sequence B, B1 and B2, at the even-numbered input entries 62 and 64, respectively. After implementing a first round of parallel calculations by the parallel processor 60, the candidate having the smallest value of the two groups is identified. For example, the value of A1 is smaller than that of B1 and the value of B2 is smaller than that of A2, so A1 is transmitted by the multiplexer 68 and B2 in transmitted by the multiplex 69. Since the value of A1 is smaller than that of B2, A1 is then transmitted by the multiplexer 70 and is identified as the one having the smallest value in the two groups of candidates. Afterwards, the input entry 61 is filled in with A3, for A3 is from the same sequence of A1. The second round of calculation needs only two steps, for the result of the comparison between A2 and B2 is known, and the candidate having the second smallest value in the two groups is then identified.

Again, the next candidate to be filed into the input entry to replace the identified candidate having the second smallest value is selected from the same sequence thereof. Likewise, the process is repeated until the specific number of candidates having the relatively smallest values in the two groups are identified. The method set for above can also be employed for combining the two sequences A and B into one sequence following an increasing order according to the values of the candidates thereof, when the process is continued until the order of all the candidates A1~A16 an B1~B16 in terms of the value has been identified.

To save the calculation resources when adopting a search tree analysis wherein each parent node is connected to a large number of child nodes, one method is to choose a specific number of nodes having relatively smaller accumulated path values during the calculation at each layer of the searching tree. The method is the so-called K-best method. For example, say there are 15 transmitting antennas and 20 receiving antennas in an MIMO communication system. A 16-QAM signal is transmitted at each transmit antenna, a K value which equals to 8 is chosen as the specific number. Since there are 15 transmitting antennas and 20 receiving antennas in the MIMO communication system in the particular example, the searching tree for modeling the system should have 15 layers, wherein each of the parent nodes is connected to 16 child nodes. During the calculation process at the first layer, 8 nodes having the relatively smallest accumulated path values are identified and the accumulated path values at the child nodes thereof are calculated. Accordingly, the other 8 nodes having larger accumulated path values will be given up for subsequent calculations. Then during the calculation process at the second layer, since there are 128 child nodes at the layer, only 8 nodes will be reserved while the other 120 ones will be given up. The K-best method helps save a lot of calculations for the decoding process.

One concern for the K-best method is whether it is appropriate to give up the many nodes of the searching tree at some early stages of the calculation process. When a certain number of the path values exit in some low layers of the searching tree, it might be not a good idea to give up any number of nodes too early. Otherwise, the node actually having the smallest accumulated path value would never be found. Therefore, it will still need to choose a large K value for adopting the K-best method. Again, when the chosen value of K is larger, the overall loading for calculation and the power consuming become larger too.

Some methods have been proposed to resolve the mentioned issue. Each method is described as below:

Method 1: Performing a singular value decomposition to the channel matrix of the communication system, and determining the K value based on the condition values calculated by the singular value decomposition process. The purpose thereof is to choose a larger K value when the condition values of the channel matrix is large, so as to reserve the maximum-likelihood solutions. However, such a method consumes a huge amount of calculation while doing the singular value decomposition, and ends up with a surge in power consuming and a lower overall throughput.

Method 2: Directly choosing a large K value, to assure the proper nodes is reserved. The price for this method is high amount of calculation as well as high power consumption.

Method 3: Performing the maximum-likelihood calculation at the first few layers of the searching tree without exception, and adopting the K-best method afterwards. However, there has been no theoretical analysis to determine how many layers that the maximum-likelihood calculation is necessary, according to the published articles, only comparisons among the relative efficacies of maximum-likelihood calculation at differ numbers of layers by means of either complexity analysis or computer simulation can be found. From a hardware application point of view, the more layers of maximum-likelihood searching induces not only large amount of calculation as well as high power consumption but also a huge requirement of memory space for storing the information of each of the possible candidates.

Method 4: Performing the maximum-likelihood calculation at the first few layers of the searching tree without exception but adopting a smaller K value for the K-best method afterwards to reduce the overall amount of calculation. The methods 3 and 4 are similar in theory.

According to one embodiment of the present invention, an optimum resolution to the mentioned issue is to maintain a maximum-likelihood calculation for the first few layers of the searching tree, based on an analysis to the channel matrix, and adopt the K-best method afterwards. Additionally, this embodiment suggests a parallel calculation process to be utilized for reducing the overall amount of calculation when the maximum-likelihood searching is needed.

Figure 6A:
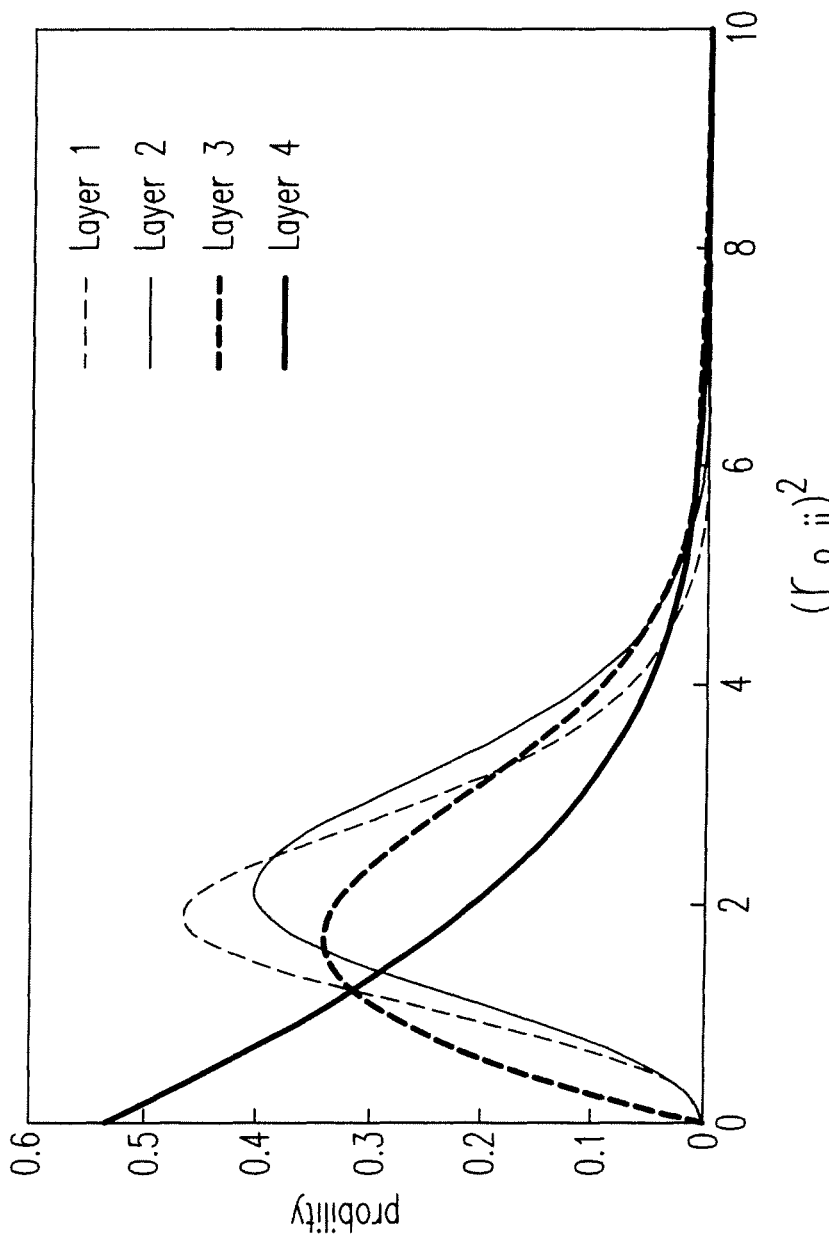
FIG. 6a is an exemplary distribution diagram illustrating the probability of the square values of diagonal elements of the R matrix resulted from QR decompositions of the channel matrix of a wireless communication system having 4 transmitting antennas and 4 receiving antennas.
Figure 6B:
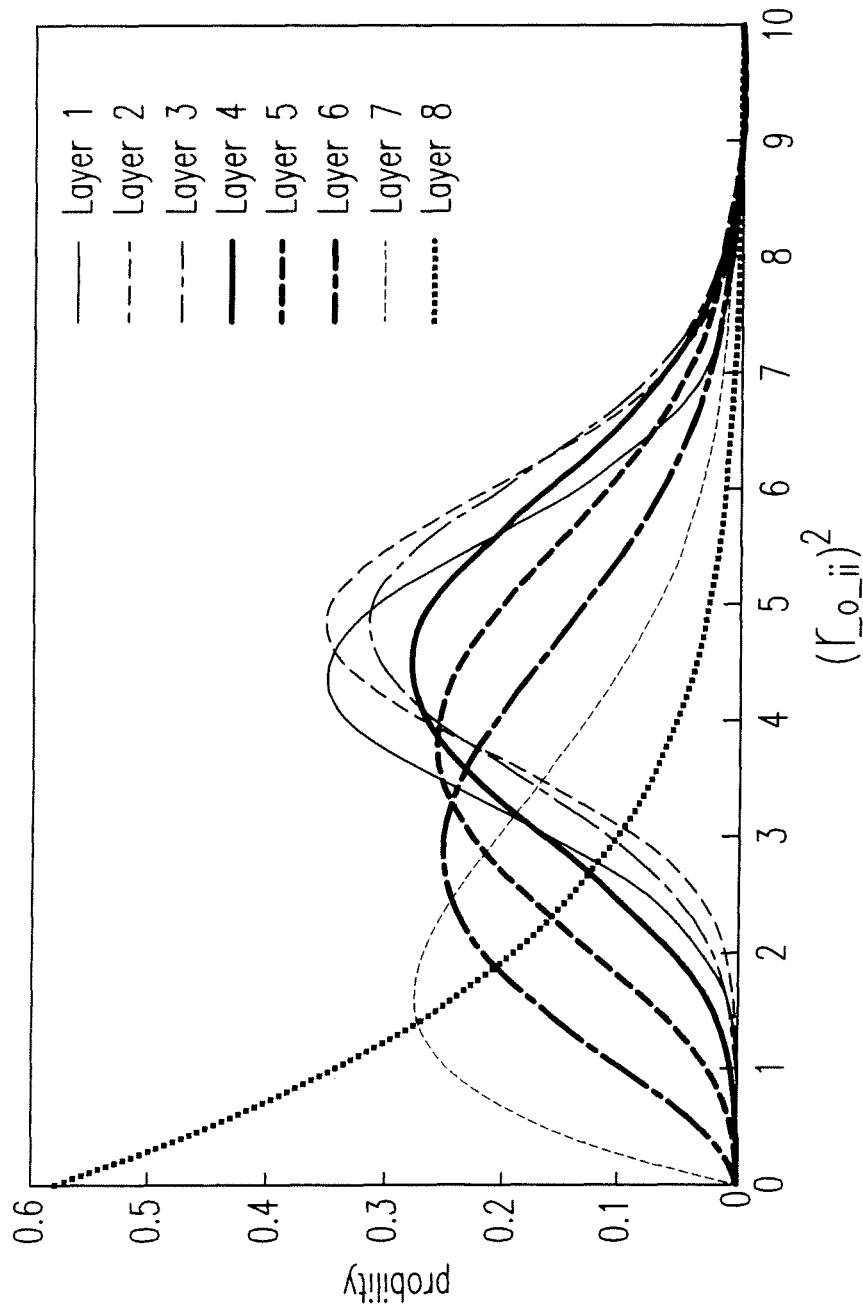
FIG. 6b is an exemplary distribution diagrams illustrating the probability of the square values of diagonal elements of the R matrix resulted from QR decompositions of the channel matrix of a wireless communication system having 8 transmitting antennas and 8 receiving antennas.

It is known to the skilled person in this art that the values of the diagonal elements of the R matrix resulting from a QR decomposition to the channel matrix of a communication system may reflect the condition of the communication system at times. Please refer to FIGS. 6a and 6b, which are exemplary distribution diagrams illustrating the probability of the square values of diagonal elements of the R matrix resulted from ordering QR decompositions to the channel matrices of wireless communication systems, each of which has 4 transmitting antennas and 4 receiving antennas and 8 transmitting antennas and 8 receiving antennas, respectively. It is observed from FIGS. 6a and 6b that, for the diagonal elements corresponding to the last two layers, there are considerably high probabilities the values of the diagonal elements are very small. Under the condition the values thereof are small, the number of effective signal points would be very large when the values is substituted back into the equations. Consequently, the scope of effective signal points might cover all the points available on the complex plane. When the K-method is adopted, there is a good opportunity that the real solution is given up for only K items at each layer of searching is reserved for subsequent calculation, and end up with decreased efficacy of the system. Based on the exemplary probability distribution functions corresponding to the two exemplary distribution diagrams, FIGS. 6a and 6b, the abovementioned effect will significantly decrease after entering into the searching at the third layer. Therefore, taking advantage of such a character, the present invention provides an assessor and the method thereof to determine whether to start a maximum-likelihood searching. Utilizing the assessor provides a judgment mechanism, which prevents discarding the real solution at the early stages of the searching process. Notably, the maximum-likelihood searching is not applicable to all conditions of communication channels. Nevertheless, the method provided by the present invention can significantly reduce unnecessary efforts to achieve the purpose of low power consuming.

Since the maximum-likelihood searching is sometimes necessary, one preferred embodiment also make use of the CCPG 40 and the parallel processor 60, illustrated in FIGS. 4a and 4b respectively, to implement the process at a high efficiency and reduce a great deal of hardware cost and power consumption.

Based on the concepts set forth above and observations as well as analysis over massive experiment data, the present invention provides a judging method for whether to employ the maximum-likelihood searching. In brief, whether the method of maximum-likelihood searching is to be employed depends on a calculation result of the following equations:

$$\frac{T_r^2 D_{K,min}^2}{E\{(d_c)^2\}} = 1 \quad (d_c)^2 = \|y - Hx_{ZF}\|^2 \qquad \text{Equation (2)}$$

Where $T_r$ is the threshold value to be found;

$D^2K,min$ is square value of the equivalent radius for collecting K points;

$E\{(d_c)^2\}$ is the estimation of square value of the distance between the receiving point and the zero-forcing solution point.

Figure 7:
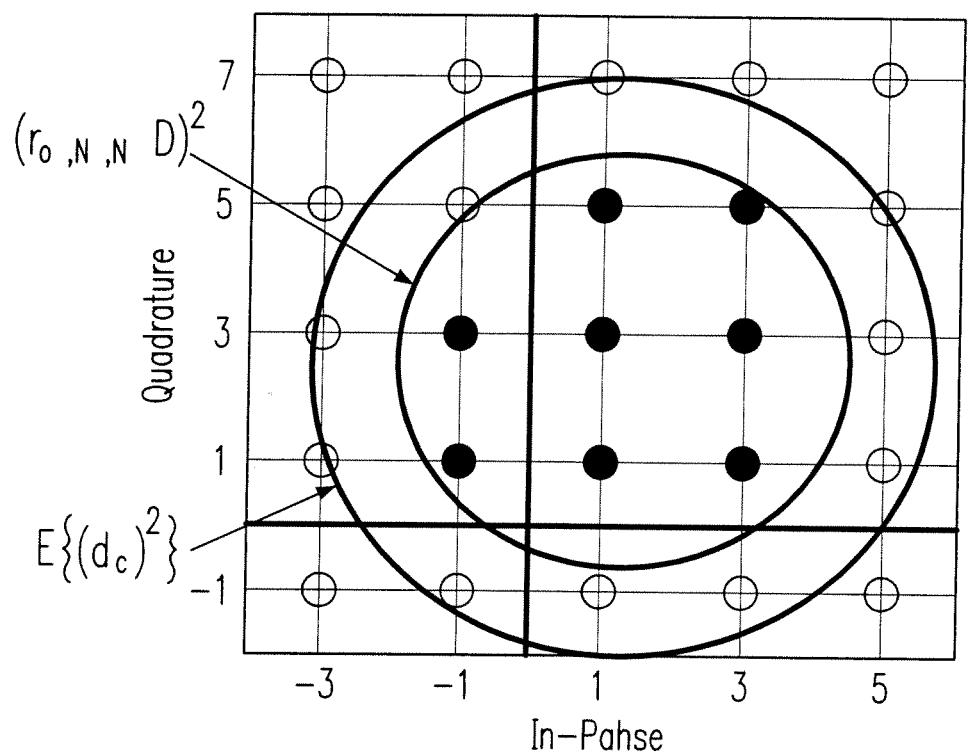
FIG. 7 is a schematic diagram illustrating a comparison of the estimation and the actual searching coverage on a constellation diagram.

That is to say, refer to FIG. 7, the last two diagonal elements in the r matrix, $r_{N,N}$ and $r_{N-1,N-1}$ are effective in a circle of an equivalent radius which is smaller than the distance between the actual point and the zero-forcing solution point. Under such a condition, some of the good candidates might be discarded when reserving K points for subsequent searching. Therefore, the maximum-likelihood searching is suggested to be employed at the first and the second layers of the searching tree. Then, K nodes having the relatively smallest accumulated path values are chosen to be continued on the searching process. Therefore, the process returns to the traditional K best algorithm.

The present invention also provide a further embodiment to deal with the complexity of conventional K-best method which doing the searching for a number of transmitting points having relatively smallest accumulated path values in an MIMO wireless communication system. Instead of choosing a sufficiently large K to achieve a performance near that of the maximum likelihood method. The embodiment reserves all candidates for performing the maximum likelihood search in the first few layers of the searching tree when dealing with poor channel conditions of the communication system, and the K-best method is adopted for the remaining layers of searching.

Given matrices $Q_o$ and $R_o$ denoting the QR decomposition of a ordered channel matrix $H_o$, the cumulative distribution function of the square value of the diagonal entries of $R_o$ is shown as below. Noted the square value of the diagonal entries of $R_o$ is denoted as $r_{o\_i,i}^2$, where i indicates the number of row where the demoted diagonal entry is located.

for $i = 1$ $$F_{r_{o,i,i}^2}(r) = \int_0^r \frac{N!}{(N-1)!(M-1)!} \left[\sum_{k=0}^{M-1} \frac{x^k}{k!} e^{-x}\right]^{N-1} \cdot x^{M-1} e^{-x} dx$$

for $2 \leq i \leq N$ $$F_{r_{o,i,i}^2}(r) = C_{ii} \int_0^1 \int_0^{r/3} \left[1 - \sum_{k=0}^{M-1} \frac{x^k}{k!} e^{-x}\right]^{i-1} \left[\sum_{k=0}^{M-1} \frac{x^k}{k!} e^{-x}\right]^{N-i} x^{M-1} e^{-x} (s)^{M-i} (1-s)^{i-2} dx ds$$

Equation (3)

where $$C_{ii} = \frac{N!}{(N-i)!(M-i)!(i-1)!(i-2)!}.$$

Figure 8A:
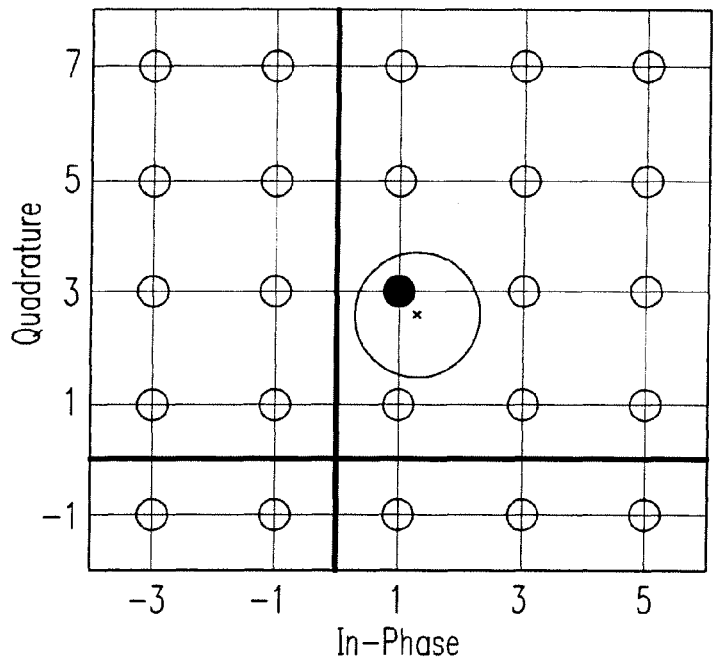
FIG. 8a is a constellation diagram illustrating the search constraint of the $N^{th}$ layer with $d_c=1.1$ and $r_{N,N}=1$.
Figure 8B:
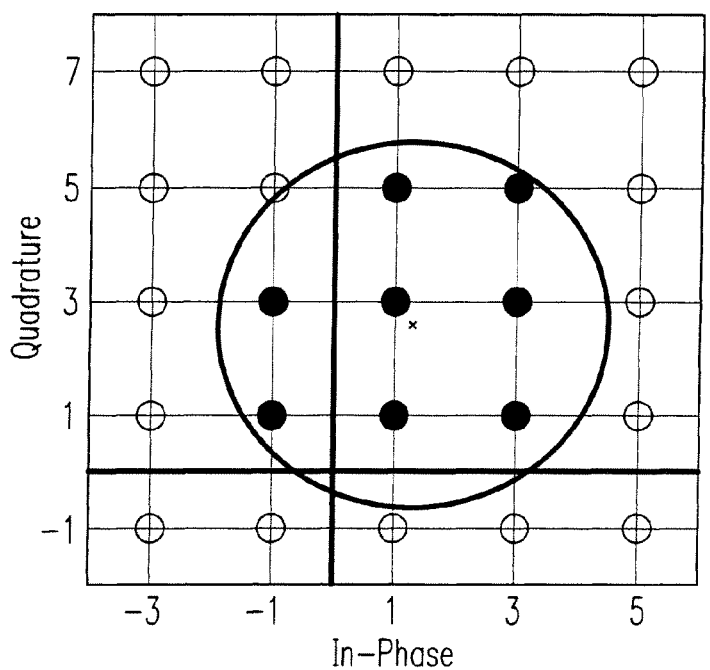
FIG. 8b is a constellation diagram illustrating the search constraint of the $N^{th}$ layer with $d_c=1.1$ and $r_{N,N}=0.33$.

To reduce computational complexity, the embodiment proposes to maintain the maximum likelihood searching at the first few layers of searching while conducting the K-best method afterwards, if there is any $r_{o\_i,i}$ whose values is less than a given threshold $T_r$. Please refer to FIGS. 8a and 8b, which illustrates the relation between the value of the diagonal entries $r_{o\_i,i}$ and the searching regions. A received signal data is located at a location x on each of the constellation diagrams as shown in FIGS. 8a and 8b. The circles indicate the searching regions and the black spots are the candidate transmitting points identified by of the searching. The values of $r_{o\_i,i}$ equal to 1 and 0.33 for the example illustrated by FIGS. 8a and 8b, respectively. It appears that the searching region is larger when the value of $r_{o\_i,i}$ is smaller, particularly when the value of $r_{o\_i,i}$ is less or equal to 1. Therefore, when the absolute value of $r_{o\_i,i}$ is very close to 0, the number of identified candidates will be very large. If only a limited number of candidates, or transmitting points, are reserved for the sequent searching steps, there will be a good opportunity to drop the optimal candidates at the early stage of the searching process.

Figure 9:
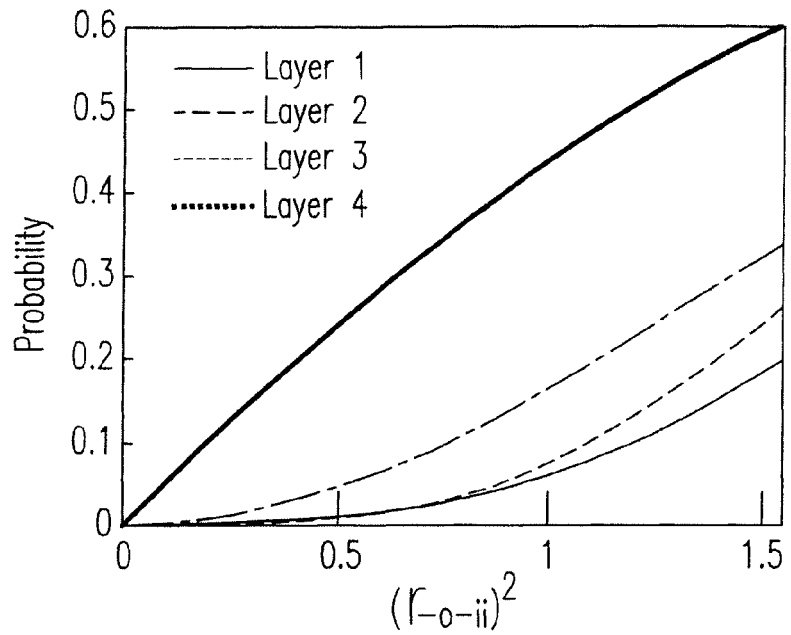
FIG. 9 is a schematic diagram illustrating the cumulative distribution function shown as the Equation (3) for a 4-by-4 MIMO communication channel.
Figure 10:
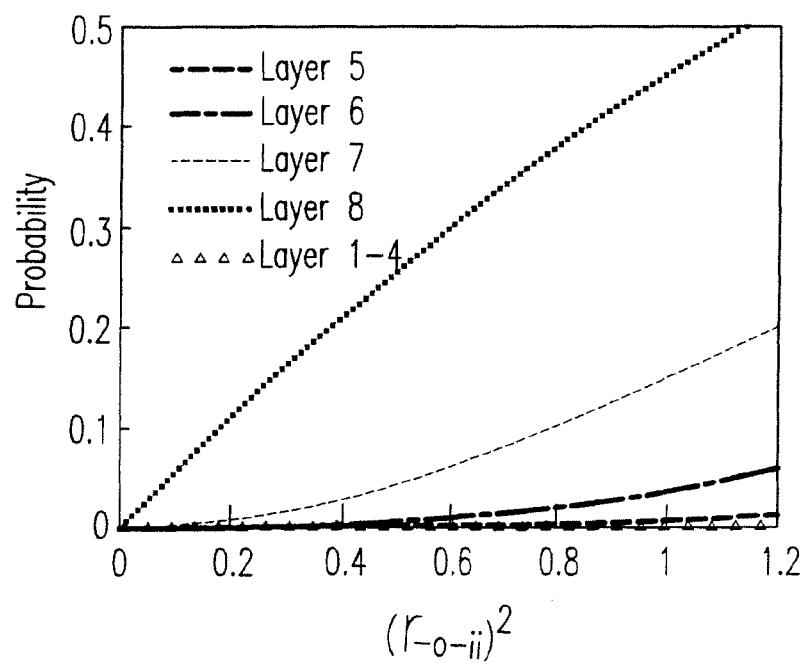
FIG. 10 is a schematic diagram illustrating the cumulative distribution function shown as the Equation (3) for an 8-by-8 MIMO communication channel.

Based on the results derived from the Equation (3), one may systematically determine the number of layers for maintaining the maximum likelihood searching. FIG. 9 schematics the cumulative distribution function shown as the Equation (3) for a 4-by-4 MIMO communication channel. The probability for the value of which is less than 1 in the $4^{th}$ layer is significantly larger than that in the other layers. Hence, a preferred embodiment is to perform the maximum likelihood search at the $4^{th}$ layer only. FIG. 10 schematics the cumulative distribution function shown as the Equation (3) for an 8-by-8 MIMO communication channel. In such an example, the probability for the values of $r_{o\_i,i}$ less than 1 in the $7^{th}$ and the $8^{th}$ layers are significantly larger than those in the other layers. Therefore, a preferred embodiment is to perform the maximum likelihood search at the $7^{th}$ and the $8^{th}$ layers.

Next, we discuss how to determine the threshold $T_r$.

$$T_r, D \geq E[(d')^2]; \text{ where } D=\text{Min}(Dk, D_{11}) \quad \text{Equation (4)}$$

Where Dk and D11 denote the distances from the Kth and $11^{th}$ nearest transmitting points to the signal point x on the constellation diagram, respectively.

From Equation (4), when the k nearest constellation nodes do not cover all the candidates inside the circle having a radius of the value $E[(d')^2]^{1/2}$, a maximum likelihood method can be activated to retain all valid nodes. However, this will incur increased complexity because the probability of performing the maximum likelihood method increases. The threshold $T_r$ thus acts as a trade-off parameter between complexity and performance.

When applying Equation (4) as a criterion to the $(N-1)^{th}$ layer and below, the obtained threshold is sure to be smaller than that of the $N^{th}$ layer because the distance contributed by the $N^{th}$ layer is a positive value. Thus, one may apply the threshold of the $N^{th}$ layer to other layers. Furthermore, a table covering most of the possible combinations of the numbers of receiving antenna and transmitting antenna in an MIMO wireless communication system can be worked out based on the cumulative possibility function provided from Equation (3) and those diagrams such as FIGS. 9 and 10 based on the accumulative possibility function, to help determining the number of layers for maintaining the maximum likelihood searching.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims that are to be accorded with the broadest interpretation so as to encompass all such modifications and similar structures.

What is claimed is:

1. An optimized K-best method in a mufti-input mufti-output (MIMO) communication system, comprising steps of: performing a QR decomposition for a channel matrix of the MIMO communication system to obtain an R matrix having a plurality of diagonal elements; determining an integer i based on a dimension of the channel matrix; and comparing the respective value of each of the i diagonal elements with a predetermined threshold, to determine whether a K-best algorithm with a predetermined number of candidates is performed, wherein the K-best algorithm is not performed for i layers of the candidates, if all the compared values of the i diagonal elements do not exceed their corresponding thresholds; and wherein the integer i is obtained according to a cumulative possibility function of the values of the diagonal elements.

2. The method as claimed in claim 1, wherein the i diagonal elements are the i diagonal elements counted from a bottom of the R matrix.

3. The method as claimed in claim 1, further comprising steps of:
    allocating all candidates available for the MIMO communication system into j sequences, when the K-best algorithm is not performed, wherein j is an integer;
    re-arranging the candidates of each of the j sequences in an increasing order according to a relative path value of each of the candidates; and
    performing a parallel calculation to identify a plurality of candidates having smallest relative path values from the re-arranged sequences.

4. The method as claimed in claim 3, wherein the relative path value is a distance on a complex plane.

5. The method as claimed in claim 3, wherein the relative path value is a real part of a distance on a complex plane.

6. The method as claimed in claim 3, wherein the relative path value is an imaginary part of a distance on a complex plane.

7. The method as claimed in claim 4, wherein the step of re-arranging the candidates is implemented by looking up a table.

8. The method as claimed in claim 4, wherein the j is a smallest integer no less than a square root of a total number of all the candidates available for the MIMO communication system.

\* \* \* \* \*